(12) United States Patent
Grost et al.

(10) Patent No.: US 9,997,155 B2
(45) Date of Patent: Jun. 12, 2018

(54) ADAPTING A SPEECH SYSTEM TO USER PRONUNCIATION

(71) Applicant: GM Global Technology Operations LLC, Detroit, MI (US)

(72) Inventors: Timothy J. Grost, Clarkston, MI (US); Cody R. Hansen, Shelby Township, MI (US); Ute Winter, Tiqwa (IL)

(73) Assignee: GM Global Technology Operations LLC, Detroit, MI (US)

(*) Notice: Subject to any disclaimer, the term of this patent is extended or adjusted under 35 U.S.C. 154(b) by 187 days.

(21) Appl. No.: 14/848,729

(22) Filed: Sep. 9, 2015

(65) Prior Publication Data
US 2017/0069311 A1 Mar. 9, 2017

(51) Int. Cl.
| | | |
|---|---|---|
| *G10L 19/00* | (2013.01) | |
| *G10L 13/00* | (2006.01) | |
| *G10L 15/06* | (2013.01) | |
| *G10L 15/26* | (2006.01) | |
| *G10L 15/02* | (2006.01) | |
| *G10L 15/22* | (2006.01) | |
| *G10L 15/00* | (2013.01) | |
| *G10L 21/00* | (2013.01) | |
| *H04M 1/725* | (2006.01) | |
| *G08B 5/00* | (2006.01) | |
| *G06Q 10/00* | (2012.01) | |

(52) U.S. Cl.
CPC ........... *G10L 15/063* (2013.01); *G10L 13/00* (2013.01); *G10L 15/02* (2013.01); *G10L 15/22* (2013.01); *G10L 15/26* (2013.01); *G10L 2015/0635* (2013.01)

(58) Field of Classification Search
USPC .......................... 704/201, 10, 235, 260, 243
See application file for complete search history.

(56) References Cited

U.S. PATENT DOCUMENTS

| | | | | |
|---|---|---|---|---|
| 6,185,535 B1* | 2/2001 | Hedin | ..................... | G10L 15/30 704/270 |
| 6,420,975 B1* | 7/2002 | Deline | ..................... | B60R 1/12 340/425.5 |
| 7,966,265 B2* | 6/2011 | Schalk | ................... | G06Q 10/10 705/319 |
| 8,332,225 B2* | 12/2012 | Zhao | ..................... | G10L 13/10 379/88.16 |
| 8,949,125 B1* | 2/2015 | Chechik | .................. | G10L 13/02 701/409 |
| 9,431,013 B2* | 8/2016 | Reuter | ................... | G10L 15/20 |
| 9,476,718 B2* | 10/2016 | Herforth | ............... | G01C 21/26 |
| 9,753,918 B2* | 9/2017 | Waibel | .................. | G10L 13/043 |
| 2006/0234680 A1* | 10/2006 | Doulton | ............... | H04L 51/066 455/412.1 |
| 2009/0043573 A1* | 2/2009 | Weinberg | ............... | G10L 17/06 704/223 |

(Continued)

*Primary Examiner* — Neeraj Sharma
(74) *Attorney, Agent, or Firm* — David Willoughby; Reising Ethington P.C.

(57) ABSTRACT

A system and method of adapting a speech system includes the steps of: receiving confirmation of a phonetic transcription of one or more names, receiving confirmation of a selected stored text result, and storing the phonetic transcription with the selected stored text result using an automatic speech recognition (ASR) system, a text-to-speech (TTS) system, or both.

19 Claims, 4 Drawing Sheets

(56) References Cited

U.S. PATENT DOCUMENTS

| | | | |
|---|---|---|---|
| 2012/0245941 A1* | 9/2012 | Cheyer | G06F 21/32 704/246 |
| 2013/0090921 A1* | 4/2013 | Liu | G10L 15/22 704/10 |
| 2014/0156272 A1* | 6/2014 | Sieger | G10L 15/26 704/235 |
| 2015/0235638 A1* | 8/2015 | Penke | G10L 19/0018 704/260 |

* cited by examiner

ADAPTING A SPEECH SYSTEM TO USER PRONUNCIATION

TECHNICAL FIELD

The present invention relates to speech systems and, more particularly, to adapting automated speech recognition (ASR) systems and text-to-speech (TTS) systems to user pronunciation.

BACKGROUND

Speech-to-text (STT) and text-to-speech (TTS) systems enable microphone-equipped computing devices to interpret speech and text. These systems provide an alternative to conventional human-to-computer input devices, such as keyboards or keypads. Many telecommunications devices are equipped with automated speech recognition (ASR) technology that detects the presence of discrete speech such as a spoken nametag or control vocabulary in the form of numerals, keywords, or commands.

However, some ASR systems fail to recognize speech from a user when it includes unusual pronunciations. This is especially true for words or names with unusual pronunciations. For example, a name might be affected by regional accents, dialects, slang, silent letters, unfamiliar consonant blends, ethnicity of the name, or any other variations in name pronunciation. Even if the ASR system correctly identifies the speech, the system TTS output to the user may differ from what is expected.

SUMMARY

According to an embodiment of the invention, there is provided a method of adapting speech systems. The method includes receiving confirmation of a phonetic transcription of one or more names, receiving confirmation of a selected stored text result, and storing the phonetic transcription with the selected stored text result using an automatic speech recognition (ASR) system, a text-to-speech (TTS) system, or both.

According to another embodiment, there is provided a second method of adapting speech systems. The method includes receiving a spoken name at an ASR system from a user via a vehicle microphone, converting the spoken name into a phonetic transcription using the ASR system, presenting the phonetic transcription to the user, receiving confirmation at the vehicle that the phonetic transcription is accurate, selecting text representing the spoken name, and storing the phonetic transcription using the ASR system, a TTS system, or both.

According to yet another embodiment, there is provided a third method of adapting speech systems. The method includes receiving a spoken phonebook entry at an ASR system from a user via a vehicle microphone, converting the spoken phonebook entry into a phonetic transcription using the ASR system, presenting the phonetic transcription to the user, receiving confirmation at the vehicle that the phonetic transcription is accurate, selecting text representing the spoken phonebook entry, and storing the phonetic transcription using the ASR system, a TTS system, or both.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION OF THE ILLUSTRATED EMBODIMENT(S)

The system and method described below involves a speech system that may be adapted to correct for misrecognized or mispronounced names. The method includes a speech system that receives confirmation that a generated phonetic transcription is satisfactory. The speech system then selects a name stored as text corresponding to the name the system determines the user wishes to access. Once the match is confirmed, the system can store the confirmed phonetic transcription using an automatic speech recognition (ASR) system, text-to-speech (TTS) system, or both. The method improves an ASR system's ability to recognize a user's speech input, and improves a TTS system's ability to provide expected output pronunciations.

Communications System—

Figure 1:
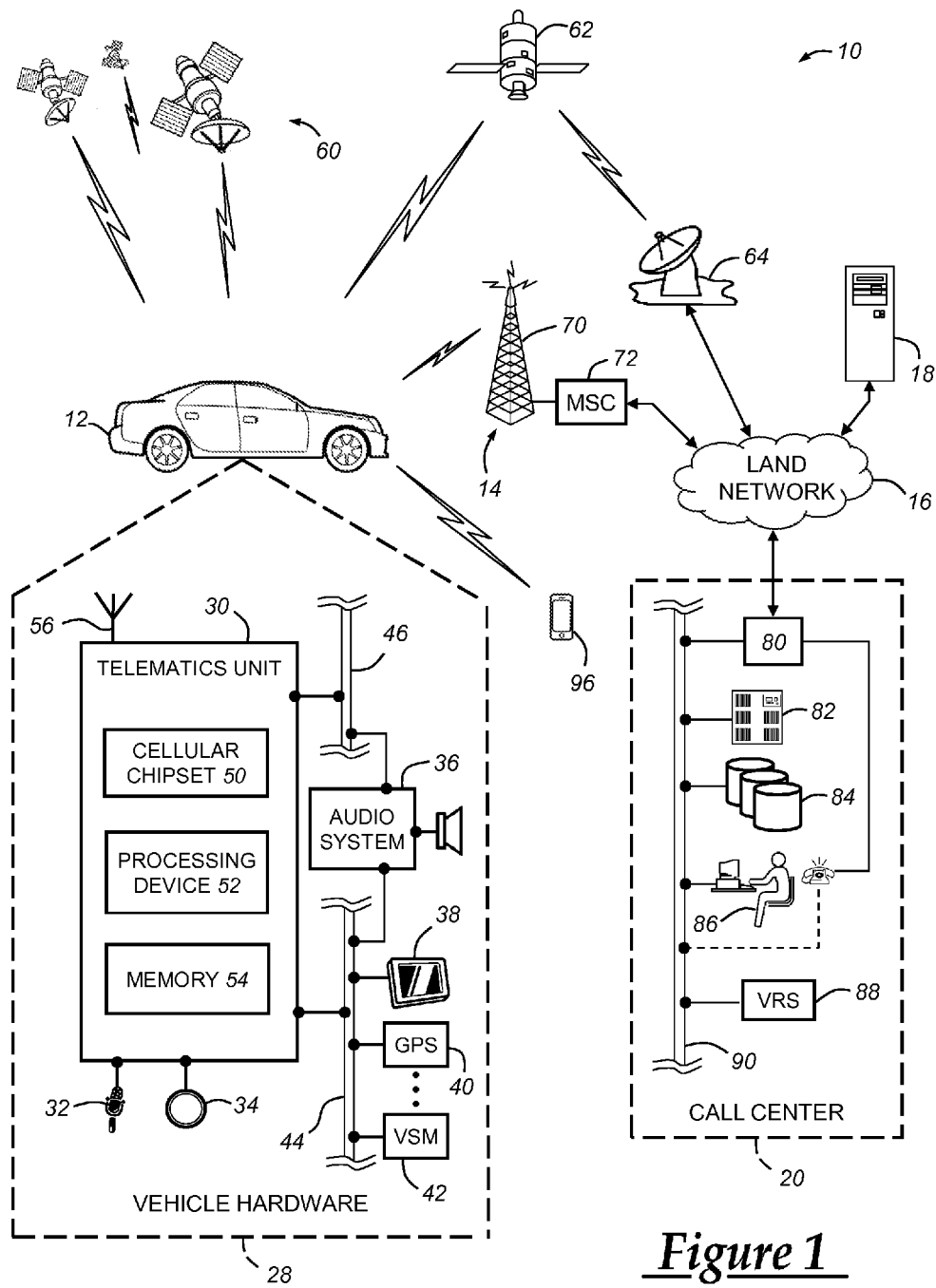
FIG. 1 is a block diagram depicting an embodiment of a communications system that is capable of utilizing the method disclosed herein.

With reference to FIG. 1, there is shown an operating environment that comprises a mobile vehicle communications system 10 and that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such communications system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 can be an OEM-installed (embedded) or aftermarket device that is installed in the vehicle and that enables wireless voice and/or data communication over wireless carrier system 14 and via wireless networking. This enables the vehicle to communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM, CDMA, or LTE standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as LTE, EVDO, CDMA, GPRS, and EDGE. Wireless networking between the vehicle and other networked devices can also be carried out using telematics unit 30. For this purpose, telematics unit 30 can be configured to communicate wirelessly according to one or more wireless protocols, including short range wireless communication (SRWC) such as any of the IEEE 802.11 protocols, WiMAX, ZigBee™, Wi-Fi direct, Bluetooth, or near field communication (NFC). When used for packet-switched data communication such as TCP/IP, the telematics unit can be configured with a static IP address or can set up to automatically receive an assigned IP address from another device on the network such as a router or from a network address server.

One of the networked devices that can communicate with the telematics unit 30 is a handheld wireless device 96, such as a smart phone. The smart phone 96 can include computer processing capability, a transceiver capable of communicating using a short-range wireless protocol, and a visual smart phone display. In some implementations, the smart phone display also includes a touch-screen graphical user interface and/or a GPS module capable of receiving GPS satellite signals and generating GPS coordinates based on those signals. Examples of the smart phone 96 include the iPhone™ manufactured by Apple and the range of Galaxy™ devices manufactured by Samsung, but others are known. These and other similar devices are types of handheld wireless device for the purposes of the methods described herein. While the smart phone 96 is described in conjunction with the methods below, it should be appreciated that other similar and/or simpler handheld wireless device can be successfully substituted for the smart phone 96 to carry out the methods/systems described herein. For instance, handheld wireless devices such as the iPad™ or iPod Touch™ can also use the short-range wireless protocols to communicate despite not having the capability to communicate via cellular protocols.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

Figure 2:
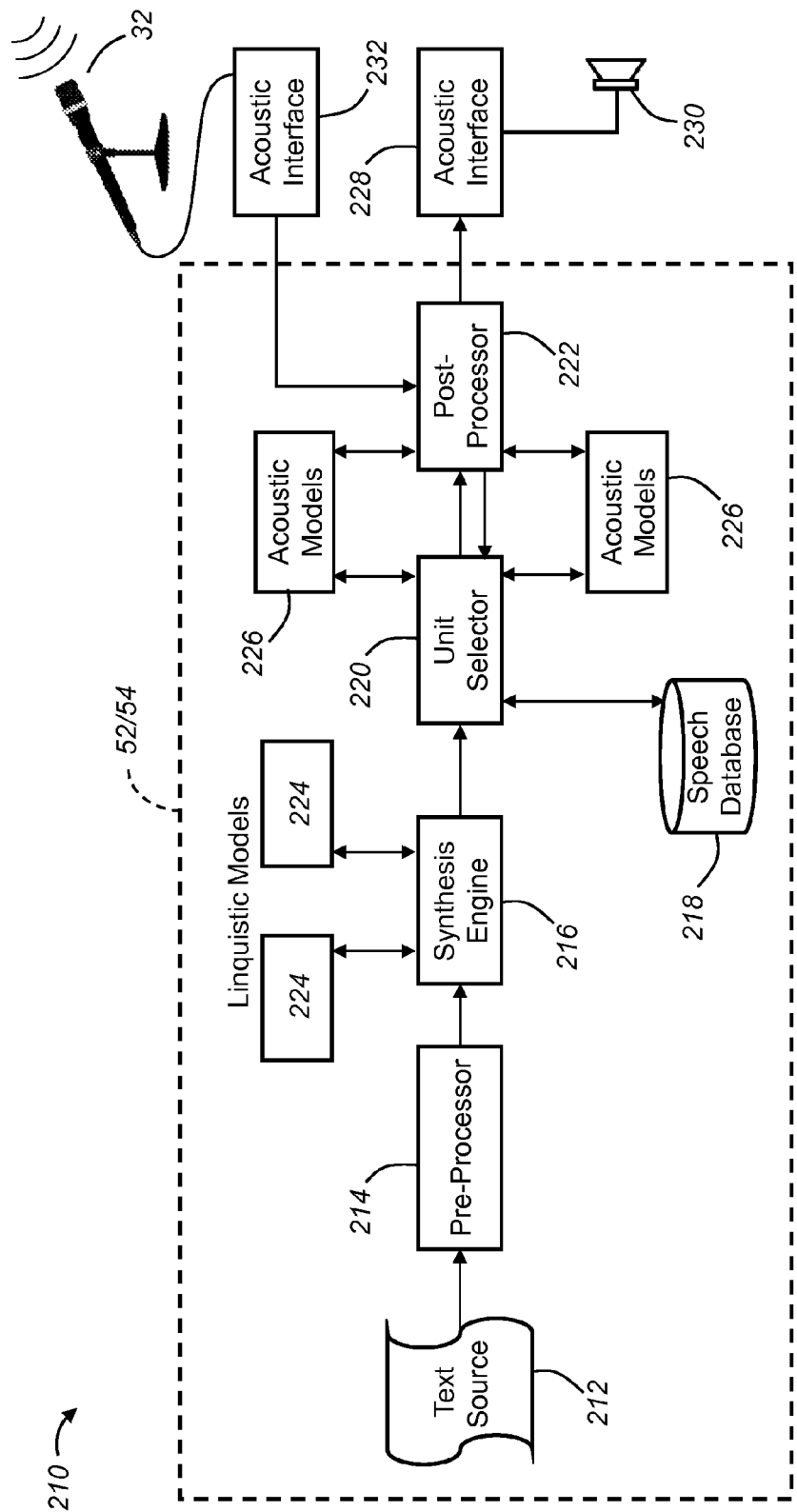
FIG. 2 is a block diagram depicting an embodiment of a text-to-speech (TTS) system that is capable of utilizing the method disclosed herein.

TTS systems are generally known to those skilled in the art, as described in the background section. But FIG. 2 illustrates an example of an improved TTS system according to the present disclosure. According to one embodiment, some or all of the system 210 can be resident on, and processed using, the telematics unit 30 of FIG. 1. According to an alternative illustrative embodiment, some or all of the TTS system 210 can be resident on, and processed using, computing equipment in a location remote from the vehicle 12, for example, the call center 20. For instance, linguistic models, acoustic models, and the like can be stored in memory of one of the servers 82 and/or databases 84 in the call center 20 and communicated to the vehicle telematics unit 30 for in-vehicle TTS processing. Similarly, TTS software can be processed using processors of one of the servers 82 in the call center 20. In other words, the TTS system 210 can be resident in the telematics unit 30 or distributed across the call center 20 and the vehicle 12 in any desired manner.

The system 210 can include one or more text sources 212, and a memory, for example the telematics memory 54, for storing text from the text source 212 and storing TTS software and data. The system 210 can also include a processor, for example the telematics processor 52, to process the text and function with the memory and in conjunction with the following system modules. A pre-processor 214 receives text from the text source 212 and converts the text into suitable words or the like. A synthesis engine 216 converts the output from the pre-processor 214 into appropriate language units like phrases, clauses, and/or sentences. One or more speech databases 218 store recorded speech. A unit selector 220 selects units of stored speech from the database 218 that best correspond to the output from the synthesis engine 216. A post-processor 222 modifies or adapts one or more of the selected units of stored speech. One or more or linguistic models 224 are used as input to the synthesis engine 216, and one or more acoustic models 226 are used as input to the unit selector 220. The system 210 also can include an acoustic interface 228 to convert the selected units of speech into audio signals and a loudspeaker 230, for example of the telematics audio system, to convert the audio signals to audible speech. The system 210 further can include a microphone, for example the telematics microphone 32, and an acoustic interface 232 to digitize speech into acoustic data for use as feedback to the post-processor 222.

The text source 212 can be in any suitable medium and can include any suitable content. For example, the text source 212 can be one or more scanned documents, text files or application data files, or any other suitable computer files, or the like. The text source 212 can include words, numbers, symbols, and/or punctuation to be synthesized into speech and for output to the text converter 214. Any suitable quantity and type of text sources can be used.

The pre-processor 214 converts the text from the text source 212 into words, identifiers, or the like. For example, where text is in numeric format, the pre-processor 214 can convert the numerals to corresponding words. In another example, where the text is punctuation, emphasized with caps or other special characters like umlauts to indicate appropriate stress and intonation, underlining, or bolding, the pre-processor 214 can convert same into output suitable for use by the synthesis engine 216 and/or unit selector 220.

The synthesis engine 216 receives the output from the text converter 214 and can arrange the output into language units that may include one or more sentences, clauses, phrases, words, subwords, and/or the like. The engine 216 may use the linguistic models 224 for assistance with coordination of most likely arrangements of the language units. The linguistic models 224 provide rules, syntax, and/or semantics in arranging the output from the text converter 214 into language units. The models 224 can also define a universe of language units the system 210 expects at any given time in any given TTS mode, and/or can provide rules, etc., governing which types of language units and/or prosody can logically follow other types of language units and/or prosody to form natural sounding speech. The language units can be comprised of phonetic equivalents, like strings of phonemes or the like, and can be in the form of phoneme HMM's.

The speech database 218 includes pre-recorded speech from one or more people. The speech can include pre-recorded sentences, clauses, phrases, words, subwords of pre-recorded words, and the like. The speech database 218 can also include data associated with the pre-recorded speech, for example, metadata to identify recorded speech segments for use by the unit selector 220. Any suitable type and quantity of speech databases can be used.

The unit selector 220 compares output from the synthesis engine 216 to stored speech data and selects stored speech that best corresponds to the synthesis engine output. The speech selected by the unit selector 220 can include pre-recorded sentences, clauses, phrases, words, subwords of pre-recorded words, and/or the like. The selector 220 may use the acoustic models 226 for assistance with comparison and selection of most likely or best corresponding candidates of stored speech. The acoustic models 226 may be used in conjunction with the selector 220 to compare and contrast data of the synthesis engine output and the stored speech data, assess the magnitude of the differences or similarities therebetween, and ultimately use decision logic to identify best matching stored speech data and output corresponding recorded speech.

In general, the best matching speech data is that which has a minimum dissimilarity to, or highest probability of being, the output of the synthesis engine 216 as determined by any of various techniques known to those skilled in the art. Such techniques can include dynamic time-warping classifiers, artificial intelligence techniques, neural networks, free phoneme recognizers, and/or probabilistic pattern matchers such as Hidden Markov Model (HMM) engines. HMM engines are known to those skilled in the art for producing multiple TTS model candidates or hypotheses. The hypotheses are considered in ultimately identifying and selecting that stored speech data which represents the most probable correct interpretation of the synthesis engine output via acoustic feature analysis of the speech. More specifically, an HMM engine generates statistical models in the form of an "N-best" list of language unit hypotheses ranked according to HMM-calculated confidence values or probabilities of an observed sequence of acoustic data given one or another language units, for example, by the application of Bayes' Theorem.

In one embodiment, output from the unit selector 220 can be passed directly to the acoustic interface 228 or through the post-processor 222 without post-processing. In another embodiment, the post-processor 222 may receive the output from the unit selector 220 for further processing.

In either case, the acoustic interface 228 converts digital audio data into analog audio signals. The interface 228 can be a digital to analog conversion device, circuitry, and/or software, or the like. The loudspeaker 230 is an electroacoustic transducer that converts the analog audio signals into speech audible to a user and receivable by the microphone 32.

The method or parts thereof can be implemented in a computer program product embodied in a computer readable medium and including instructions usable by one or more processors of one or more computers of one or more systems to cause the system(s) to implement one or more of the method steps. The computer program product may include one or more software programs comprised of program instructions in source code, object code, executable code or other formats; one or more firmware programs; or hardware description language (HDL) files; and any program related data. The data may include data structures, look-up tables, or data in any other suitable format. The program instructions may include program modules, routines, programs, objects, components, and/or the like. The computer program can be executed on one computer or on multiple computers in communication with one another.

The program(s) can be embodied on computer readable media, which can be non-transitory and can include one or more storage devices, articles of manufacture, or the like. Exemplary computer readable media include computer system memory, e.g. RAM (random access memory), ROM (read only memory); semiconductor memory, e.g. EPROM (erasable, programmable ROM), EEPROM (electrically erasable, programmable ROM), flash memory; magnetic or optical disks or tapes; and/or the like. The computer readable medium may also include computer to computer connections, for example, when data is transferred or provided over a network or another communications connection (either wired, wireless, or a combination thereof). Any combination(s) of the above examples is also included within the scope of the computer-readable media. It is therefore to be understood that the method can be at least partially performed by any electronic articles and/or devices capable of carrying out instructions corresponding to one or more steps of the disclosed method.

Figure 3:
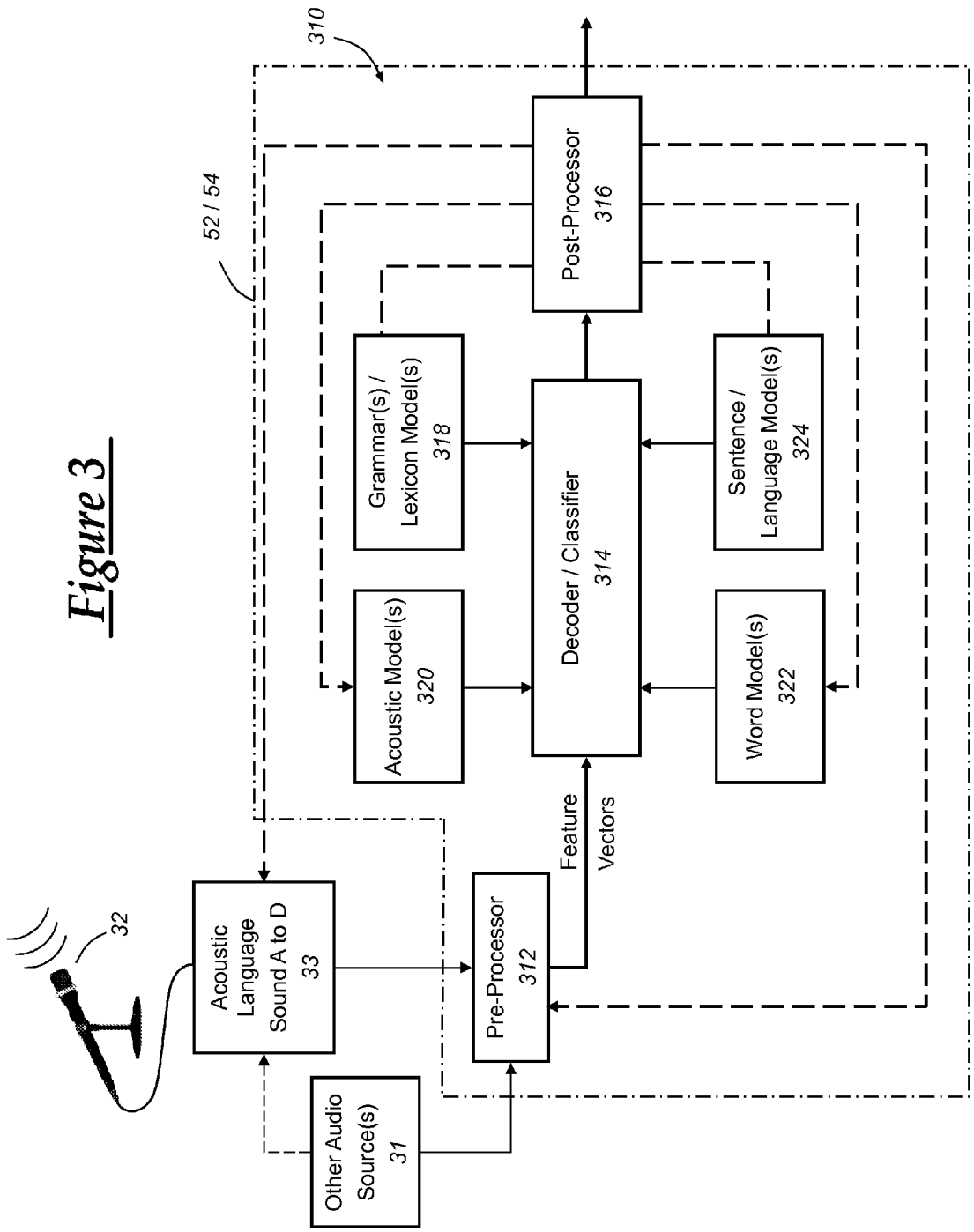
FIG. 3 is a block diagram depicting an embodiment of an automatic speech recognition (ASR) system that is capable of utilizing the method disclosed herein.

Turning now to FIG. 3, there is shown an exemplary architecture for an ASR system 310 that can be used to enable the presently disclosed method. In general, a vehicle occupant vocally interacts with an automatic speech recognition system (ASR) for one or more of the following fundamental purposes: training the system to understand a vehicle occupant's particular voice; storing discrete speech such as a spoken nametag or a spoken control word like a numeral or keyword; or recognizing the vehicle occupant's speech for any suitable purpose such as voice dialing, menu navigation, transcription, service requests, vehicle device or device function control, or the like. Generally, ASR extracts acoustic data from human speech, compares and contrasts the acoustic data to stored subword data, selects an appropriate subword which can be concatenated with other selected subwords, and outputs the concatenated subwords or words for post-processing such as dictation or transcription, address book dialing, storing to memory, training ASR models or adaptation parameters, or the like.

ASR systems are generally known to those skilled in the art, and FIG. 3 illustrates just one specific exemplary ASR system 310. The system 310 includes a device to receive speech such as the telematics microphone 32, and an acoustic interface 33 such as a sound card of the telematics unit 30 having an analog to digital converter to digitize the speech into acoustic data. The system 310 also includes a memory such as the telematics memory 54 for storing the acoustic data and storing speech recognition software and databases, and a processor such as the telematics processor 52 to process the acoustic data. The processor functions with the memory and in conjunction with the following modules: one or more front-end processors, pre-processors, or pre-processor software modules 312 for parsing streams of the acoustic data of the speech into parametric representations such as acoustic features; one or more decoders or decoder software modules 314 for decoding the acoustic features to yield digital subword or word output data corresponding to the input speech utterances; and one or more back-end processors, post-processors, or post-processor software modules 316 for using the output data from the decoder module(s) 314 for any suitable purpose.

The system 310 can also receive speech from any other suitable audio source(s) 31, which can be directly communicated with the pre-processor software module(s) 312 as shown in solid line or indirectly communicated therewith via the acoustic interface 33. The audio source(s) 31 can include, for example, a telephonic source of audio such as a voice mail system, or other telephonic services of any kind.

One or more modules or models can be used as input to the decoder module(s) 314. First, grammar and/or lexicon model(s) 318 can provide rules governing which words can logically follow other words to form valid sentences. In a broad sense, a lexicon or grammar can define a universe of vocabulary the system 310 expects at any given time in any given ASR mode. For example, if the system 310 is in a training mode for training commands, then the lexicon or grammar model(s) 318 can include all commands known to and used by the system 310. In another example, if the system 310 is in a main menu mode, then the active lexicon or grammar model(s) 318 can include all main menu commands expected by the system 310 such as call, dial, exit, delete, directory, or the like. Second, acoustic model(s) 320 assist with selection of most likely subwords or words corresponding to input from the pre-processor module(s) 312. Third, word model(s) 322 and sentence/language model(s) 324 provide rules, syntax, and/or semantics in placing the selected subwords or words into word or sentence context. Also, the sentence/language model(s) 324 can define a universe of sentences the system 310 expects at any given time in any given ASR mode, and/or can provide rules, etc., governing which sentences can logically follow other sentences to form valid extended speech.

According to an alternative exemplary embodiment, some or all of the ASR system 310 can be resident on, and processed using, computing equipment in a location remote from the vehicle 12 such as the call center 20. For example, grammar models, acoustic models, and the like can be stored in memory of one of the servers 82 and/or databases 84 in the call center 20 and communicated to the vehicle telematics unit 30 for in-vehicle speech processing. Similarly, speech recognition software can be processed using processors of one of the servers 82 in the call center 20. In other words, the ASR system 310 can be resident in the telematics unit 30 or distributed across the call center 20 and the vehicle 12 in any desired manner, and/or resident at the call center 20. In that way, it should also be apparent that the smart phone 96 can access a separate speech recognition system having functionality or a configuration similar to that of the ASR system 310 located either at the smart phone 96 or accessible from the smart phone 96 via the wireless carrier system 14. The speech recognition system located apart from the smart phone 96 could be located at a variety of locations, such as computer 18, as is known to those skilled in the art.

First, acoustic data is extracted from human speech wherein a vehicle occupant speaks into the microphone 32, which converts the utterances into electrical signals and communicates such signals to the acoustic interface 33. A sound-responsive element in the microphone 32 captures the occupant's speech utterances as variations in air pressure and converts the utterances into corresponding variations of analog electrical signals such as direct current or voltage. The acoustic interface 33 receives the analog electrical signals, which are first sampled such that values of the analog signal are captured at discrete instants of time, and are then quantized such that the amplitudes of the analog signals are converted at each sampling instant into a continuous stream of digital speech data. In other words, the acoustic interface 33 converts the analog electrical signals into digital electronic signals. The digital data are binary bits which are buffered in the telematics memory 54 and then processed by the telematics processor 52 or can be processed as they are initially received by the processor 52 in real-time.

Second, the pre-processor module(s) 312 transforms the continuous stream of digital speech data into discrete sequences of acoustic parameters. More specifically, the processor 52 executes the pre-processor module(s) 312 to segment the digital speech data into overlapping phonetic or acoustic frames of, for example, 10-30 ms duration. The frames correspond to acoustic subwords such as syllables, demi-syllables, phones, diphones, phonemes, or the like. The pre-processor module(s) 312 also performs phonetic analysis to extract acoustic parameters from the occupant's speech such as time-varying feature vectors, from within each frame. Utterances within the occupant's speech can be represented as sequences of these feature vectors. For example, and as known to those skilled in the art, feature vectors can be extracted and can include, for example, vocal pitch, energy profiles, spectral attributes, and/or cepstral coefficients that can be obtained by performing Fourier transforms of the frames and decorrelating acoustic spectra using cosine transforms. Acoustic frames and corresponding parameters covering a particular duration of speech are concatenated into unknown test pattern of speech to be decoded.

Third, the processor executes the decoder module(s) 314 to process the incoming feature vectors of each test pattern. The decoder module(s) 314 is also known as a recognition engine or classifier, and uses stored known reference patterns of speech. Like the test patterns, the reference patterns are defined as a concatenation of related acoustic frames and corresponding parameters. The decoder module(s) 314 compares and contrasts the acoustic feature vectors of a subword test pattern to be recognized with stored subword reference patterns, assesses the magnitude of the differences or similarities therebetween, and ultimately uses decision logic to choose a best matching subword as the recognized subword. In general, the best matching subword is that which corresponds to the stored known reference pattern that has a minimum dissimilarity to, or highest probability of being, the test pattern as determined by any of various techniques known to those skilled in the art to analyze and recognize subwords. Such techniques can include dynamic time-warping classifiers, artificial intelligence techniques, neural networks, free phoneme recognizers, and/or probabilistic pattern matchers such as Hidden Markov Model (HMM) engines.

HMM engines are known to those skilled in the art for producing multiple speech recognition model hypotheses of acoustic input. The hypotheses are considered in ultimately identifying and selecting that recognition output which represents the most probable correct decoding of the acoustic input via feature analysis of the speech. More specifically, an HMM engine generates statistical models in the form of an "N-best" list of subword model hypotheses ranked according to HMM-calculated confidence values or probabilities of an observed sequence of acoustic data given one or another subword such as by the application of Bayes' Theorem.

A Bayesian HMM process identifies a best hypothesis corresponding to the most probable utterance or subword sequence for a given observation sequence of acoustic feature vectors, and its confidence values can depend on a variety of factors including acoustic signal-to-noise ratios associated with incoming acoustic data. The HMM can also include a statistical distribution called a mixture of diagonal Gaussians, which yields a likelihood score for each observed feature vector of each subword, which scores can be used to reorder the N-best list of hypotheses. The HMM engine can also identify and select a subword whose model likelihood score is highest.

In a similar manner, individual HMMs for a sequence of subwords can be concatenated to establish single or multiple word HMM. Thereafter, an N-best list of single or multiple word reference patterns and associated parameter values may be generated and further evaluated.

In one example, the speech recognition decoder 314 processes the feature vectors using the appropriate acoustic models, grammars, and algorithms to generate an N-best list of reference patterns. As used herein, the term reference patterns is interchangeable with models, waveforms, templates, rich signal models, exemplars, hypotheses, or other types of references. A reference pattern can include a series of feature vectors representative of one or more words or subwords and can be based on particular speakers, speaking styles, and audible environmental conditions. Those skilled in the art will recognize that reference patterns can be generated by suitable reference pattern training of the ASR system and stored in memory. Those skilled in the art will also recognize that stored reference patterns can be manipulated, wherein parameter values of the reference patterns are adapted based on differences in speech input signals between reference pattern training and actual use of the ASR system. For example, a set of reference patterns trained for one vehicle occupant or certain acoustic conditions can be adapted and saved as another set of reference patterns for a different vehicle occupant or different acoustic conditions, based on a limited amount of training data from the different vehicle occupant or the different acoustic conditions. In other words, the reference patterns are not necessarily fixed and can be adjusted during speech recognition.

Using the in-vocabulary grammar and any suitable decoder algorithm(s) and acoustic model(s), the processor accesses from memory several reference patterns interpretive of the test pattern. For example, the processor can generate, and store to memory, a list of N-best vocabulary results or reference patterns, along with corresponding parameter values. Exemplary parameter values can include confidence scores of each reference pattern in the N-best list of vocabulary and associated segment durations, likelihood scores, signal-to-noise ratio (SNR) values, and/or the like. The N-best list of vocabulary can be ordered by descending magnitude of the parameter value(s). For example, the vocabulary reference pattern with the highest confidence score is the first best reference pattern, and so on. Once a string of recognized subwords are established, they can be used to construct words with input from the word models 322 and to construct sentences with the input from the language models 324.

Finally, the post-processor software module(s) 316 receives the output data from the decoder module(s) 314 for any suitable purpose. In one example, the post-processor software module(s) 316 can identify or select one of the reference patterns from the N-best list of single or multiple word reference patterns as recognized speech. In another example, the post-processor module(s) 316 can be used to convert acoustic data into text or digits for use with other aspects of the ASR system or other vehicle systems. In a further example, the post-processor module(s) 316 can be used to provide training feedback to the decoder 314 or pre-processor 312. More specifically, the post-processor 316 can be used to train acoustic models for the decoder module(s) 314, or to train adaptation parameters for the pre-processor module(s) 312.

Method—

Figure 4:
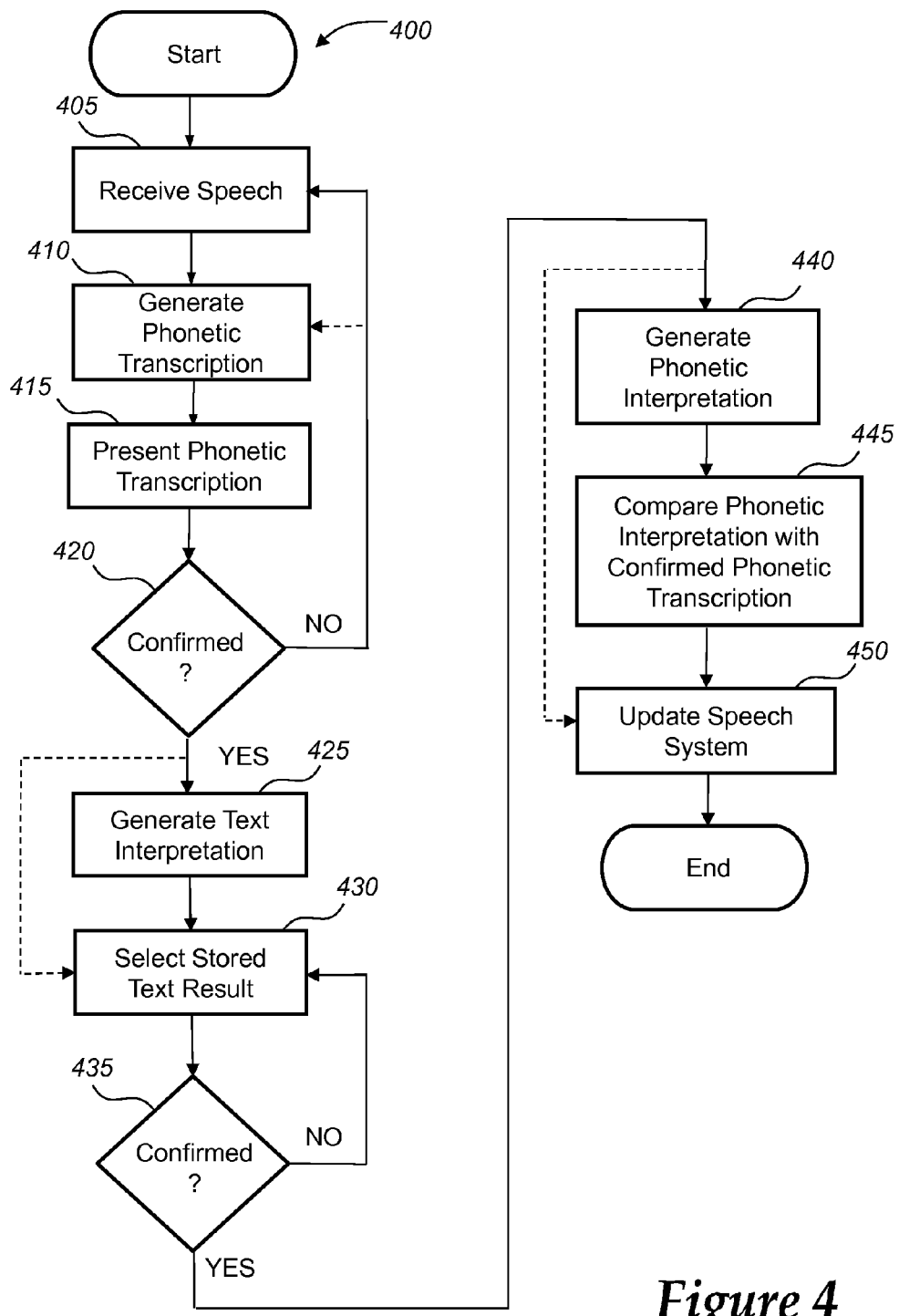
FIG. 4 is a flow chart of an embodiment of a method of adapting speech systems.

Turning now to FIG. 4, there is shown an exemplary embodiment of a method 400 for adapting speech systems. The method 400 may be carried out using the architecture of the TTS system 210 and ASR system 310 in the environment of communications system 10. "Speech system(s)" as is used herein refers to a TTS system 210, an ASR system 310, or both. Those skilled in the art will recognize that the method 400 may be carried out using ASR, TTS, and communications systems other than those described here. The method 400 disclosed herein may be initiated each time a user recites a name, or it may be initiated only when the output from the speech system falls below a pre-determined confidence threshold.

The method 400 begins at step 405 by receiving speech input containing a name from a user or vehicle occupant at an ASR system 310. In general, the speech input can be received at the microphone 32, which converts the speech input into electrical signals and communicates the signals to the acoustic interface 33. A name can include the name of an individual, street, song, website, or any other word, phrase, or utterance a user might provide to the ASR system 310. For example, the user may recite a command to "Call Jeff Biers." The ASR system 310 receives speech including the name "Jeff Biers." The method 400 can then proceed to step 410.

At step 410, received speech may be processed into a phonetic transcription using the ASR system 310. The ASR system 310 can subdivide the name received as speech into a chain of individual units based on the user's pronunciation. The chain of individual units may solely comprise full phonemes, or it may be parts of phonemes, such as triphones or any other kind of phonetic representation of the acoustic signal. This may be done using the pre-processor module(s) 312 to extract acoustic parameters from the user's speech, such as time-varying feature vectors. Continuing with the example given with respect to step 405, the ASR system 310 can produce a phonetic transcription such as "jh eh f b iy r z," based on the user's pronunciation "Jeff Biers." The method 400 proceeds to step 415, where the phonetic transcription is presented. In some embodiments, the phonetic transcription may be audibly presented to the user in a variety of ways. For example, the audio system 36 can audibly provide the user the phonetic transcription. One option for presentation of the phonetic transcription based on the user's input is to ask the user if the phonetic transcription is correct, such as "Jeff Biers—correct?" However, in other embodiments it should be appreciated that presentation of a phonetic transcription can be omitted. In one example, the audible presentation of the transcription can be omitted when the vehicle telematics unit 30 is linked to the handheld wireless device 96 via a short-range wireless link. This will be described below in more detail. The method 400 proceeds to step 420.

At step 420, the user or system (vehicle telematics unit 30, TTS system 210, or ASR system 310) can confirm whether the phonetic transcription is accurate. User confirmation may be implicit such that a user may implicitly confirm the phonetic transcription based on behavior observed at the vehicle 12. For instance, the vehicle telematics unit 30 can monitor the playback of a chosen song for a predetermined period of time or match a user's pronunciation with a name and phone number the user uses to place a call. If a phonetic transcription is conveyed to the user along with an uninterrupted action at the vehicle 12 (e.g., song playback or phone call completion), then the vehicle telematics unit 30, the TTS system, 210, or the ASR system 310 can determine that the user implicitly confirmed that the phonetic transcription was accurate without receiving any direct feedback from the user. In some implementations, the vehicle telematics unit 30, the TTS system, 210, or the ASR system 310 can determine implicit confirmation with respect to actions initiated at the handheld wireless device 96. This will be discussed below in greater detail.

User confirmation may also be explicit. In another example, the user may be prompted to answer "yes" or "no" to the ASR system 310 by asking the user if the phonetic transcription in step 415 is correct. If the user answers "no," the ASR system 310 may prompt the user to pronounce the name again, repeating steps 405-420. Alternatively, the ASR system 310 may loop back to step 410, as is shown by the segmented line in FIG. 4, and offer a new phonetic transcription without asking the user to pronounce the name again. The method 400 can repeat steps 405-415 or steps 410-415 until the user gives a positive confirmation at step 420. The ASR system 310 may exclude previously-rejected phonetic transcriptions from being available for presentation, meaning a phonetic transcription that has been rejected by the user in step 420 may not be available in subsequent performances of any or all of steps 405-415. Furthermore, in some instances, the ASR system 310 may be confident enough in its generated results to confirm the phonetic transcription without seeking user confirmation. This can be done, for example, by tracking the immediate or longer request history, or by comparing confidence scores from multiple speech systems. In certain embodiments, it may be unnecessary to implement any or all of steps 410-420 or those steps could be carried out using the smart phone 96. In some implementations, a confirmed phonetic transcription can be received at the ASR system 310 through a different mechanism. For example, the ASR system 310 may acquire the phonetic transcription from the smart phone 96 or other handheld wireless device that has already captured the user's acoustic data. The method 400 may proceed to step 425, or the method may proceed directly to step 430 as indicated by a segmented line in FIG. 4.

The ASR system 310 can optionally perform step 425 and generate a text interpretation of the spoken name. Step 425 may be performed in embodiments where step 430 compares generated text interpretation with a plurality of stored text to identify a match. The generated text interpretation involves the ASR system 310 converting the confirmed phonetic transcription from step 420 into a text-based representation of the received name. This may be done using decoder module(s) 314, which, as described earlier in this disclosure, uses decision logic techniques to choose best matching subwords which can be combined to generate a text interpretation of a spoken name. The method proceeds to step 430.

At step 430, the ASR system 310 can compare the generated text representation of the spoken name with stored text and select or select and present a stored text result. Stored text may include an entry in a user's contact list, navigation data used by telematics unit 30, music collection entries such as the names of songs or artists, or other stored data. This stored text may be located onboard within vehicle electronic 28 or off-board at remote locations. For example, the telematics unit 30 can include a memory device 54 that maintains the text in computer-readable memory that is accessible by the processor 52. The selected stored text result may be presented to the user via at least a portion of the vehicle electronics 28. For example, the visual display 38 may display the words "Jeff Biers." A stored text result can be selected by comparing the text interpretation of step 425 against stored text. For example, the ASR system 310 may compare language subunits, such as the subwords generated in step 425. The ASR system 310 searches through the stored text and locates those results with similar subunits. Similar decision logic techniques, such as HMM engines, are used until a stored text is selected.

However, step 430 may be carried out in multiple ways. The method 400 can proceed directly from step 420 to step 430 if no text interpretation is generated at step 425. When step 430 is reached directly from step 420, this is shown as a segmented line in FIG. 4. In one implementation, a stored text result can be selected by comparing the confirmed phonetic transcription from step 420 with the phonetic transcriptions of stored text. The ASR system 310 can search stored text and locate text having similar phonetic transcriptions. Ultimately, a phonetic transcription from the text can be chosen as best matching the confirmed phonetic transcription. The stored text result may be obtained using the TTS system 210 described above. For example, the TTS system 210 may make use of HMM engines which return a best recognition result based on a predetermined confidence threshold. Further, it is also possible that the phonetic transcription in step 420 can be compared to the phonetic transcriptions associated with the stored text and at least one recognition result retrieved if at least one parameter value is greater than a threshold value. The number of recognition results may be regulated by adjusting the threshold value. In some occurrences zero results may be returned at a given threshold. In such cases, the ASR system 310 may ask the user if the user wishes to add that name and related information, such as a phone number, as a new text entry. Alternatively, the ASR system 310 may continuously lower the threshold value until a result is obtained. The method proceeds to step 435.

At step 435, the user indicates whether the selected stored text result from step 430 is correct. This may be done by utilizing at least a portion of the vehicle electronics 28, such as the microphone 32, the pushbutton(s) 34, or the visual display 38. For example, the user can either respond by saying "yes" or "no" to a visually or orally received stored text result, which is received by the microphone 32. Or the user can respond by compressing a pushbutton 34. In other embodiments, the user may be asked to verify the data corresponding to that name, such as a phone number. Steps 430-435 can be repeated until the correct text is identified. In some embodiments, if the confirmed phonetic transcription from step 420 is sufficiently similar to the phonetic transcription of the selected stored text result from step 430, the user may not be asked to confirm whether the phonetic transcription of the selected stored text result is correct and step 435 is bypassed.

When the vehicle telematics unit 30 is connected to the smart phone 96 via short-range wireless link, the ASR system 310 can compare confirmed text with actions the user carries out at the smart phone 96. For instance, the stored text result can be confirmed within a predetermined time of an action at the smart phone 96. In one example, the user could confirm the stored text result and within 15 seconds the smart phone 96 may place a call to a telephone number stored in its directory. The smart phone 96 can wirelessly transmit the telephone number used to place the call and the name associated with that telephone number from the directory to the vehicle telematics unit 30 via a Bluetooth Low Energy (BLE) connection. If the text-based name received from the smart phone 96 matches the text result selected above an accepted confidence level, the ASR system 310 can confirm the selected text result without user input. Separately, sometimes the ASR system 310 may fail to return the proper stored text at step 430, and the user may desire not to continuously repeat steps 430-435 until the correct stored text is returned. Instead, the user can enter the name manually using pushbuttons(s) 34, visual display 38, touch screens, or other available on- or off-board modalities. Progressing through the method 400, some embodiments will proceed to step 440 and others to step 450. When the method 400 bypasses steps 440 and 445, this is shown as a segmented line in FIG. 4.

When method 400 proceeds to step 440, the speech system generates a phonetic interpretation of the confirmed text from step 435 using the TTS system 210, ASR system 310, or both. The phonetic interpretation may be comprised fully of phonemes, but may also be comprised, in full or in part, of tri-phones or any other phonetic representation units. The phonetic interpretation can be a separate phonetic transcription generated by the TTS system 210 that represents the phonetic pronunciation of a name or text. For example, the TTS system 210 may generate the phonetic interpretation of "jh eh d s iy r z" for "Jeff Biers." In instances where phonetic transcriptions were compared in step 430, the phonetic interpretation may match the phonetic transcription stored with the confirmed stored text result from step 435. The generation of a phonetic interpretation may be desirable when the goal is to confirm that a pre-existing pronunciation used by the speech system is correct and if not, replace the pre-existing pronunciation with the pronunciation confirmed by the user. At step 445, the phonetic interpretation can be compared against the confirmed phonetic transcription processed in step 420. For example, the ASR system 310 can recognize the differences in phonemes three and four where the user's confirmed phonetic transcription is "jh eh f b iy r z" and the phonetic interpretation is "jh eh d s iy r z." The method 400 proceeds to step 450.

At step 450, TTS system 210, ASR system 310, or both, can adopt the confirmed phonetic transcription. If step 450 is reached through steps 440-445, the TTS system 210, ASR system 310, or both, can alter its phonetic interpretation to the confirmed phonetic transcription, or add it as a preferred phonetic transcription. For example, subsequent uses of the TTS system 210 or ASR system 310 with respect to "Jeff Biers" can return a pronunciation of "jh eh f b iy r z." If the method 400 proceeds directly from step 435 to step 450, the ASR system 310 can add the confirmed phonetic transcription with the stored text. Using the same example, if a user makes a request for "Jeff Biers" using the pronunciation "jh eh f b iy r z," this will return an exact match to the phonetic transcription stored for Jeff Biers. It is also possible that different phonetic transcriptions may be stored for different users. The confirmed phonetic transcription can be stored in a database or other memory device for use with TTS system 310, ASR system 310, or both located at the vehicle 12, such as memory 54, or remotely located. Alternatively, the transcription can be stored in TTS system 210, ASR system 310, or both for direct use only with a specific module.

The steps of method 400, presented above, may be carried out using the TTS system 210 and the ASR system 310 located at the vehicle 12. However, the results generated by the TTS system 210 and the ASR system 310 can be compared against remotely-located speech recognition systems that are accessible by the vehicle telematics unit 30, the smart phone 96, or both. A spoken name can be sent to more than one speech recognition system—for example, the ASR system 310 and another remotely-located speech recognition system accessible by the smart phone 96 via the wireless carrier system 14. Using both on- and off-board speech recognition systems that can simultaneously process the same spoken name, it is possible to compare confidence scores and results to cross verify and determine the quality of a phonetic transcription in both systems. For example, a secondary speech recognition system may be remotely-located at the computer 18 or call center 20 and work simultaneously with ASR system 310.

It is possible to have ASR system 310 and a remotely-located speech recognition system each process spoken names. In one implementation, the ASR system 310 can process spoken names along with the smart phone 96 connected to the vehicle telematics unit 30 via short-range wireless link. In such instances, the ASR system 310 can receive speech at step 405, carry out its own recognition of that speech using any or all of steps 410-430, and compare its stored text result from step 430 with the speech recognition results generated by the phone 96 at confirmation step 435. For example, the user may activate the speech recognition function of the smart phone 96 and command the phone to "call Jeff Biers." At step 405, the ASR system 310 receives the speech either by capturing the speech itself using microphone 32 or by receiving an audio file from the phone 96. The smart phone 96 can perform its own speech recognition on the speech and place a call to contact Jeff Biers. The ASR system 310 can receive the dialed telephone number along with the name "Jeff Biers." The ASR system 310 can then link the speech from step 405 and the phonetic transcription from step 420 with the contact text name, "Jeff Biers."

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of adapting speech systems, comprising the steps of:
    a) receiving confirmation of a phonetic transcription of one or more names, wherein the phonetic transcription is a phonetic representation of a user's pronunciation of the one or more names received as speech from the user;
    b) generating, using an automatic speech recognition (ASR) system installed in the vehicle, a text interpretation of the confirmed phonetic transcription of the user's pronunciation of the one or more names, wherein the ASR system includes a processor configured to execute instructions stored in a non-transitory memory of the ASR system;
    c) using the ASR system, a text-to-speech (TTS) system at the vehicle, or both, selecting a stored text result by comparing the confirmed phonetic transcription associated with the text interpretation generated in step b), with phonetic transcriptions associated with stored text located within electronics on-board the vehicle or located within electronics at a remote location off-board the vehicle;
    d) receiving confirmation of a selected stored text result based on the comparison in step c); and
    e) storing the confirmed phonetic transcription with the selected stored text result in one or more modules, including memory modules, of the ASR system, the text-to-speech (TTS) system, or both, wherein the confirmed phonetic transcription represents a user-specific pronunciation of the selected stored text.

2. The method of claim 1, wherein the phonetic transcription is confirmed by the user, the ASR system, or the TTS system.

3. The method of claim 1, wherein the one or more names further comprises a name of a person, a song, a website, a file, a phone number, or a street address.

4. The method of claim 1, further comprising the step of initiating steps (a)-(e) when an output from the ASR system, the TTS system, or both falls below a predetermined confidence threshold.

5. The method of claim 1, wherein the ASR system is used with a remote speech recognition system accessed via a handheld wireless device.

6. A method of adapting speech systems, comprising the steps of:
   a) receiving a spoken name at an automatic speech recognition (ASR) system installed in a vehicle from a user via a vehicle microphone, wherein the ASR system includes a processor configured to execute instructions stored in a non-transitory memory of the ASR system;
   b) converting the spoken name into a phonetic transcription using the ASR system, wherein the phonetic transcription is a phonetic representation of the user's pronunciation of the spoken name;
   c) presenting the phonetic transcription to the user;
   d) receiving confirmation at the vehicle that the phonetic transcription is accurate;
   e) selecting text representing the spoken name;
   f) generating a phonetic interpretation from the selected text in step (e), wherein the phonetic interpretation is a phonetic representation of the selected text;
   g) comparing the phonetic interpretation of the selected text in step f) with the confirmed phonetic transcription of the user's pronunciation of the spoken name in step (d); and
   h) storing the confirmed phonetic transcription in one or more modules, including memory modules, of the ASR system, a text-to-speech (TTS) system, or both, based on the comparison in step g), wherein the confirmed phonetic transcription represents a user-specific pronunciation of the selected text.

7. The method of claim 6, wherein a text interpretation is generated from the confirmed phonetic transcription in step (d).

8. The method of claim 6, wherein the phonetic transcription is confirmed by the user, the ASR system, or the TTS system.

9. The method of claim 6, wherein the spoken name further comprises a name of a person, a song, a website, a file, a phone number, or a street address.

10. The method of claim 6, further comprising the step of initiating steps (a)-(h) when the output from the ASR system, the TTS system, or both falls below a predetermined confidence threshold.

11. The method of claim 6, wherein the text in step (e) is selected through comparison of the confirmed phonetic transcription in step (d) with phonetic transcriptions of stored text.

12. The method of claim 7, wherein the text in step (e) is selected through comparison of the text interpretation with stored text.

13. The method of claim 6, wherein the user confirms the selected text result in step (e).

14. The method of claim 6, wherein the stored confirmed phonetic transcription in step (h) is stored in place of a previously stored phonetic transcription.

15. A method of adapting speech systems, comprising the steps of:
   a) receiving a spoken phonebook entry at an automatic speech recognition (ASR) system installed in a vehicle from a user via a vehicle microphone, wherein the ASR system includes a processor configured to execute instructions stored in a non-transitory memory of the ASR system;
   b) converting the spoken phonebook entry into a phonetic transcription using the ASR system, wherein the phonetic transcription is a phonetic representation of the user's pronunciation of the spoken phonebook entry;
   c) presenting the phonetic transcription to the user;
   d) receiving confirmation at the vehicle that the phonetic transcription is accurate;
   e) selecting text representing the spoken phonebook entry;
   f) generating a phonetic interpretation from the selected text in step (e), wherein the phonetic interpretation is a phonetic representation of the selected text;
   g) comparing the phonetic interpretation in step f) with the confirmed phonetic transcription of the user's pronunciation of the spoken name in step (d); and
   h) storing the confirmed phonetic transcription in one or more modules, including memory modules, of the ASR system, a text-to-speech (TTS) system, or both, based on the comparison in step g), wherein the confirmed phonetic transcription represents a user-specific pronunciation of the selected text.

16. The method of claim 15, wherein a text interpretation is generated from the confirmed phonetic transcription in step (d).

17. The method of claim 15, wherein the text in step (e) is selected through comparison of the confirmed phonetic transcription in step (d) with phonetic transcriptions of stored text.

18. The method of claim 16, wherein the text in step (e) is accessed through comparison of the text interpretation with the stored text.

19. The method of claim 15, wherein the user confirms the selected stored text result in step (e).

* * * * *